United States Patent
Poletto et al.

(10) Patent No.: US 11,003,327 B2
(45) Date of Patent: *May 11, 2021

(54) SYSTEMS AND METHODS FOR DISPLAYING AN IMAGE CAPTURING MODE AND A CONTENT VIEWING MODE

(71) Applicant: DROPBOX, INC., San Francisco, CA (US)

(72) Inventors: Stephen Poletto, San Francisco, CA (US); Yi Wei, San Francisco, CA (US); Joshua Puckett, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/722,893

(22) Filed: Oct. 2, 2017

(65) Prior Publication Data

US 2018/0024715 A1 Jan. 25, 2018

Related U.S. Application Data

(63) Continuation of application No. 14/247,397, filed on Apr. 8, 2014, now Pat. No. 9,811,245.

(Continued)

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0482* (2013.01); *G06F 3/0486* (2013.01);
(Continued)

(58) Field of Classification Search
CPC .... G06F 3/048; G06F 3/04886; G06F 3/0484; G06F 3/0482; G06F 3/0167
See application file for complete search history.

(56) References Cited

U.S. PATENT DOCUMENTS

| | | | |
|---|---|---|---|
| 5,138,460 A | 8/1992 | Egawa | |
| 6,025,827 A | 2/2000 | Bullock et al. | |

(Continued)

FOREIGN PATENT DOCUMENTS

EP 2544126 1/2013

OTHER PUBLICATIONS

Bergmann, Francine B.; Manssour, Isabel H.; Silveira, Milene S.; De Oliveira, Joao Batista S.; "Automatic layout generation for digital photo albums: A user study", Lecture Notes in Computer Science, v 8006 LNCS, n Part 3, p. 117-126, 2013; 15th International Conference on Human-Computer Interaction, HCI Internationa! 2013, Jul. 21, 2013-Jul. 26, 2013.

(Continued)

*Primary Examiner* — Pei Yong Weng
(74) *Attorney, Agent, or Firm* — Keller Jolley Preece

(57) ABSTRACT

Embodiments are also provided for displaying an image capturing mode and a content viewing mode. In some embodiments, one or more live images may be received from an image capturing component on a mobile device. A user interface may display the live images on a touch-sensing display interface of the mobile device. A first gesture may also be detected with the touch-sensing display interface. In response to detecting the first gesture, at least a portion of a collection of content items may be displayed within a first region of the user interface, and/or the one or more live images may be displayed within a second region of the user interface.

20 Claims, 9 Drawing Sheets

Related U.S. Application Data

(60) Provisional application No. 61/945,803, filed on Feb. 27, 2014, provisional application No. 61/920,719, filed on Dec. 24, 2013.

(51) Int. Cl.

| | | |
|---|---|---|
| *G06F 3/0482* | (2013.01) | |
| *G06F 3/16* | (2006.01) | |
| *G06F 3/0486* | (2013.01) | |
| *G06F 3/0488* | (2013.01) | |
| *H04L 29/08* | (2006.01) | |

(52) U.S. Cl.
  CPC ...... *G06F 3/04883* (2013.01); *G06F 3/04886* (2013.01); *G06F 3/167* (2013.01); *H04L 67/10* (2013.01); *H04L 67/30* (2013.01)

(56) References Cited

U.S. PATENT DOCUMENTS

| | | |
|---|---|---|
| 6,983,424 B1 | 1/2006 | Dutta |
| 7,432,920 B2 | 10/2008 | Schick et al. |
| 7,562,311 B2 | 7/2009 | Schiller |
| 7,706,637 B2 | 4/2010 | Marriott |
| 7,843,581 B2 | 11/2010 | Hill et al. |
| 8,013,874 B2 | 9/2011 | Reid et al. |
| 8,106,856 B2 | 1/2012 | Matas et al. |
| 8,218,057 B2 | 7/2012 | Kobayashi et al. |
| 8,385,952 B2 | 2/2013 | Friedman |
| 8,413,076 B2 | 4/2013 | Ishizawa |
| 8,593,427 B1 | 11/2013 | Yang et al. |
| 8,698,920 B2 | 4/2014 | Uemura et al. |
| 8,713,448 B2 | 4/2014 | Hirako |
| 10,120,528 B2 | 11/2018 | Poletto et al. |
| 10,282,056 B2 | 5/2019 | Wei et al. |
| 2003/0182326 A1 | 9/2003 | Patterson |
| 2004/0143598 A1 | 7/2004 | Drucker |
| 2005/0192924 A1 | 9/2005 | Drucker |
| 2005/0243381 A1 | 11/2005 | Hill et al. |
| 2006/0109517 A1 | 5/2006 | Catalan |
| 2006/0146765 A1 | 7/2006 | Van De Sluis |
| 2006/0215905 A1* | 9/2006 | Kitamura ........... G06K 9/00248 |
| | | 382/159 |
| 2007/0024722 A1 | 2/2007 | Eura et al. |
| 2007/0081740 A1 | 4/2007 | Ciudad et al. |
| 2007/0097430 A1 | 5/2007 | Kitamaru et al. |
| 2007/0234226 A1 | 10/2007 | Szeto |
| 2008/0115086 A1* | 5/2008 | Rupp ................. G06Q 10/10 |
| | | 715/810 |
| 2008/0195961 A1 | 8/2008 | Bae et al. |
| 2008/0307307 A1 | 12/2008 | Ciudad et al. |
| 2008/0309617 A1* | 12/2008 | Kong .................. G06F 3/0482 |
| | | 345/157 |
| 2009/0002335 A1 | 1/2009 | Chaudhri |
| 2009/0040324 A1 | 2/2009 | Nonaka |
| 2009/0094531 A1 | 4/2009 | Danieli et al. |
| 2009/0113336 A1 | 4/2009 | Reifman |
| 2009/0298547 A1 | 12/2009 | Kim et al. |
| 2009/0303352 A1 | 12/2009 | Fujinawa |
| 2010/0162171 A1* | 6/2010 | Felt ..................... G06F 3/0481 |
| | | 715/835 |
| 2010/0172550 A1* | 7/2010 | Gilley ............... G06K 9/00288 |
| | | 382/118 |
| 2011/0064319 A1 | 3/2011 | Momosaki |
| 2011/0072344 A1 | 3/2011 | Harris et al. |
| 2011/0083111 A1 | 4/2011 | Forutanpour et al. |
| 2011/0209057 A1 | 8/2011 | Hinckley |
| 2011/0219312 A1 | 9/2011 | Kim et al. |
| 2011/0283223 A1 | 11/2011 | Vaittinen et al. |
| 2011/0304760 A1 | 12/2011 | Lee et al. |
| 2012/0066630 A1 | 3/2012 | Kim et al. |
| 2012/0099012 A1 | 4/2012 | Ryu et al. |
| 2012/0179976 A1 | 7/2012 | Lee et al. |
| 2012/0198386 A1 | 8/2012 | Hautala |
| 2012/0331108 A1 | 12/2012 | Ferdowsi et al. |
| 2013/0036363 A1 | 2/2013 | Johnson |
| 2013/0072263 A1 | 3/2013 | Kim |
| 2013/0080954 A1 | 3/2013 | Carlhian et al. |
| 2013/0167055 A1 | 6/2013 | Penev et al. |
| 2013/0225236 A1 | 8/2013 | Lee et al. |
| 2013/0238990 A1 | 9/2013 | Ubillos et al. |
| 2013/0332856 A1 | 12/2013 | Sanders et al. |
| 2014/0040762 A1 | 2/2014 | Kuscher et al. |
| 2014/0071323 A1 | 3/2014 | Yi et al. |
| 2014/0146212 A1 | 5/2014 | Jung et al. |
| 2014/0157169 A1 | 6/2014 | Kikin-Gil |
| 2014/0191986 A1 | 7/2014 | Kim et al. |
| 2015/0026209 A1* | 1/2015 | Xiang ................. G06F 16/583 |
| | | 707/769 |
| 2015/0058754 A1 | 2/2015 | Rauh |
| 2015/0177937 A1 | 6/2015 | Poletto et al. |

OTHER PUBLICATIONS

International Search Report dated Nov. 4, 2014, as received in International Application No. PCT/US2014/049120, 11 pgs.
U.S. Appl. No. 14/247,762, dated Jul. 2, 2014, Office Action.
U.S. Appl. No. 14/247,762, dated Dec. 18, 2014, Office Action.
U.S. Appl. No. 14/247,762, dated Sep. 24, 2015, Office Action.
U.S. Appl. No. 14/247,762, dated Mar. 24, 2016, Office Action.
U.S. Appl. No. 14/247,762, dated Dec. 19, 2016, Notice of Allowance.
U.S. Appl. No. 14/247,762, dated Jun. 2, 2017, Office Action.
U.S. Appl. No. 14/247,762, dated Oct. 18, 2017, Office Action.
U.S. Appl. No. 14/247,762, dated Aug. 14, 2018, Notice of Allowance.
U.S. Appl. No. 14/247,768, dated Jul. 3, 2014, Office Action.
U.S. Appl. No. 14/247,768, dated Feb. 3, 2015, Office Action.
U.S. Appl. No. 14/247,768, dated Oct. 9, 2015, Office Action.
U.S. Appl. No. 14/247,768, dated Dec. 27, 2018, Notice of Allowance.
International Search Report issued in PCT/US14/49145 dated Nov. 20, 2014.
U.S. Appl. No. 14/247,397, dated Jun. 6, 2016, Office Action.
U.S. Appl. No. 14/247,397, dated Oct. 27, 2016, Office Action.
U.S. Appl. No. 14/247,397, dated Mar. 16, 2017, Office Action.
U.S. Appl. No. 14/247,397, dated Jul. 5, 2017, Notice of Allowance.

* cited by examiner

SYSTEMS AND METHODS FOR DISPLAYING AN IMAGE CAPTURING MODE AND A CONTENT VIEWING MODE

CROSS REFERENCE TO RELATED APPLICATIONS

This application is a continuation of U.S. application Ser. No. 14/247,397, filed Apr. 8, 2014, which claims the benefit of and priority to U.S. Provisional Application No. 61/945,803, filed Feb. 27, 2014 and U.S. Provisional Application No. 61/920,719, filed Dec. 24, 2013. Each of the aforementioned patent(s), and applications(s) is hereby incorporated by reference in its entirety.

FIELD OF THE INVENTION

Various embodiments generally relate to displaying an image capturing mode and a content viewing mode.

BACKGROUND

Now more than ever before, people are using user devices (e.g., smartphones, tablets, etc.) as a means for listening to music, taking photographs and videos, and sharing content with friends and social media networks. Although cameras and other components of user devices, are improving exponentially, their overall functions have largely remained unchanged. Thus, current applications often require a user to switch between a content viewing mode and an image or content capturing mode. For example, although a user device may include a high quality camera, a user still may have to exit the camera mode in order to view photos taken by the camera or stored on the user device. This may be cumbersome, as it may be much easier for a user to be able to view both the content viewing mode and the image capturing mode simultaneously without the need to exit one mode and switch to the other.

Furthermore, it can be difficult for a user to quickly and efficiently organize content items into a collection and perform an action on the collection. For example, a user may want to share photographs from a photo album. However, it may be difficult for the user to recall all the images selected to be shared once they are ready to perform a share. Thus, it would be useful for a user to not only easily create collections of content items for sharing, but to also view the content items included within the collections and/or perform one or more actions on the collections jointly within a stand alone application.

SUMMARY

Systems, methods, and non-transitory computer readable mediums for simultaneously displaying an image capturing mode and collections of content items are provided. Such systems may include one or more processors, one or more image capturing components, a display interface, and memory containing instructions.

Such methods may include receiving an output from an image capturing component on a user's user device. For example, user devices may include one or more cameras capable of capturing still images, videos, multi-shot images, high-definition ("HD") images, 3-D images, or any other type of image, or any combination thereof. The output may be presented within a user interface displayed on a display interface of the user device. In some embodiments, a first gesture may be detected with the displaying interface. In response to detecting the first gesture, at least a portion of a collection of content items may be displayed within a first region of the user interface and the received output may also be displayed within a second region of the user interface.

In some embodiments, a second gesture may be detected with the display interface. The second gesture may capture a first image, a first set of continuous images (e.g., a multi-shot image), and/or a first video from the received output. The first image, the first set of continuous images, and/or the first video may then be placed in the collection of content items. In some embodiments, the collection of content items may be synchronized with an authorized account on a content management system automatically. Thus, updates to the collection of content items may be synched with the user account as items are added to the collection.

In some embodiments, one or more contacts associated with a user of the user device may be determined to be included within the received output. The received output and a listing of collections of content items including one or more images of the determined one or more contacts may then be displayed within the user interface. For example, a user's spouse may be determined to be within the received output, and one or more collections of content items (e.g., photo albums) that also include images of the user's spouse/family may be displayed within the user interface along with the received output. This may help the user to determine in which, if any, collection the user may want to place an image captured from the received images.

In some embodiments, a first gesture may be detected with the display interface that captures a first image and/or a first video from the received output. In some embodiments, the gesture may be associated with what may be captured. For example, the user may tap on the display interface to capture a photograph, or the user may provide a long press on the display interface to capture a video. In some embodiments, a second gesture may also be detected that may display the received output within a first region of the user interface and a collection of applications within a second region of the user interface. In some embodiments, a captured image and/or video may then be placed within one or more of the applications from the collection of applications.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Methods, systems, and computer readable mediums for simultaneously displaying an image capturing mode and a content viewing mode are provided. By displaying both the image capturing mode and the content viewing mode, users may no longer be required to switch between modes in order to view both a camera output and a photo album, for example.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

Figure 1:
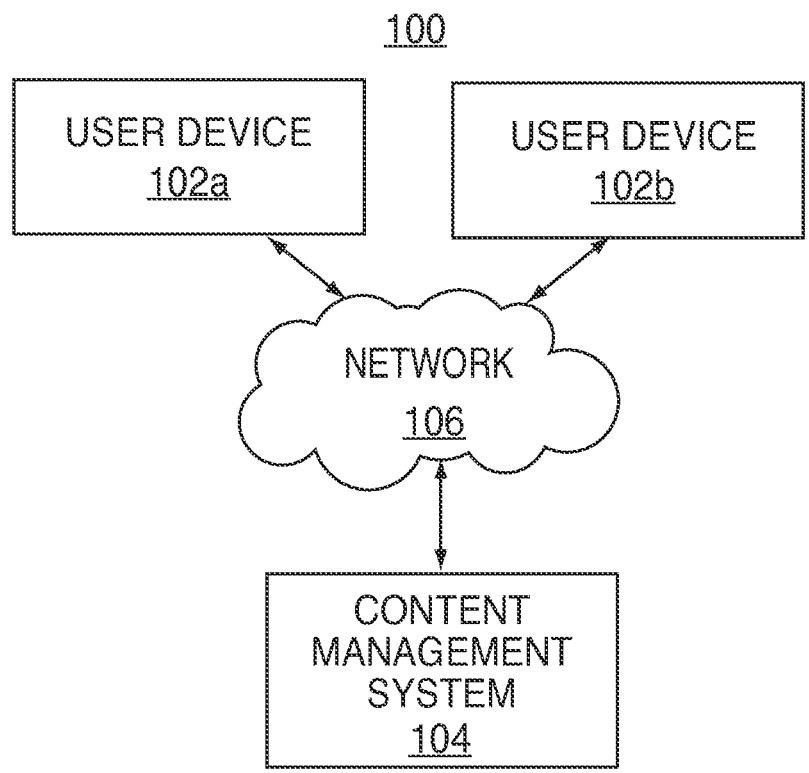
FIG. 1 shows an exemplary system in accordance with various embodiments.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 12.

Figure 2:
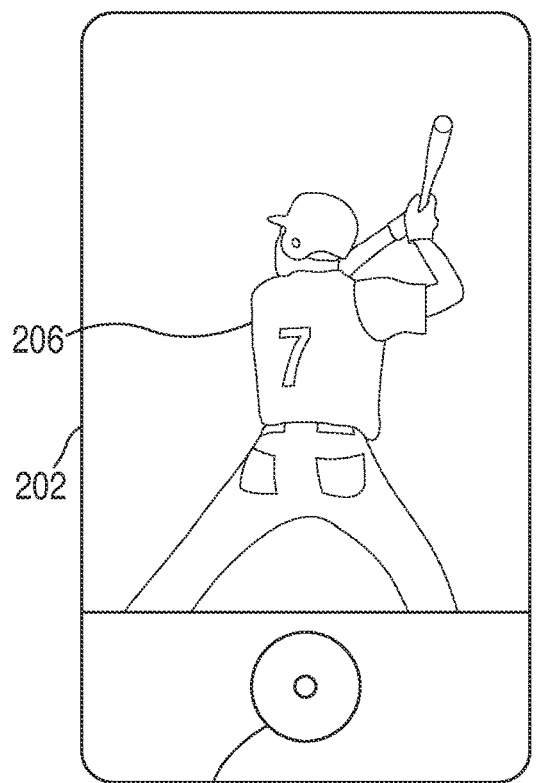
FIG. 2 shows a schematic illustration of a user interface displaying continuous real-time images in accordance with various embodiments.

FIG. 2 shows a schematic illustration of an exemplary user interface displaying continuous real-time images in accordance with various embodiments. User interface 200 may be displayed on display interface 202 of a user device (e.g., devices 102). In some embodiments, user interface 200 may correspond to an application resident on a user device. For example, user interface 200 may be associated with a dedicated application that interfaces with one or more servers (e.g., a social media network, a content management system, a gaming system, etc.). Display interface 202 may, in some embodiments, correspond to a touch screen, a display interface, and/or interactive display included on a user device (e.g., user devices 102 of FIG. 1). In some embodiments, display interface 202 may fully occupy one side of the device. However, display interface 202 may not be required to fully occupy the display, and may occupy any portion of the device's display. Various types of user devices may include, but are not limited to, smart phones, mobile phones, tablet computers, personal digital assistants (PDAs), laptop computers, digital music players, and/or any other type of user device capable of including a display interface. User devices may, in some embodiments, include one or more image capturing components (e.g., camera 138). Various display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the display interface may include a multi-touch panel coupled to one or more processors to receive and detect gestures. Multi-touch panels, for example, may include capacitive sensing mediums having a one or more row traces and/or driving line traces, and one or more column traces and/or sensing lines. Although multi-touch panels are described herein as one example for display interface, persons of ordinary skill in the art will recognize that any display interface may be used.

In some embodiments, user interface 200 may include image 206 displayed on display interface 202. Image 206 may be any image, set of images, and/or video captured by one or more image capturing components (e.g., cameras 138) on a user device. For example, image 206 may be a photograph captured by a user operating their smartphone. In some embodiments, image 206 may be displayed on user interface 200 in a "full-screen" mode. For example, image 206 may occupy the entire display space available by display interface 202. This, however, is merely exemplary and image 206 may be displayed across any portion and/or amount of display interface 202.

In some embodiments, user interface 200 may include button 204. Button 204 may be any button capable of capturing image 206 displayed on display interface 202. In some embodiments, button 204 may be a virtual button included within user interface 200 displayed on display interface 202. In some embodiments, button 204 may be a physical button capable of being depressed by the user. In some embodiments, the user device may include more than one button 204. For example, image 206 may include a continuous stream of images (e.g., whatever is captured by a lens of a camera on the user device), and the user may capture one or more images (e.g., multi-shot, video, etc.), by pressing button 204 located at a lower portion of the user interface and/or on a side of the user device.

In some embodiments, image 206 may correspond to a music item or a video item displayed on user interface 200. In this particular scenario, button 204 may not be displayed and/or may serve one or more additional functions (e.g., play, pause, etc.). In some embodiments, image 206 may correspond to a captured image and button 204 may not be displayed. In this particular scenario, a user may capture image 206 using any suitable mechanism or gesture. For example, the user may tap on display interface 202 to capture image 206. As another example, a user may provide one or more voice commands to capture image 206.

In some embodiments, the user may provide one or more gestures that may be detected by display interface 202. For example, a user may perform a swipe, a flick, a finger roll, a tap, a hand wave, a hovering gesture, and/or any other gesture, or any combination of gestures. Detection of one or more gestures may cause user interface 200 to perform one or more corresponding actions. For example, the user may perform a flick, which may cause a collection of images to be displayed on user interface 200. The gesture or gestures may be performed using any suitable object. For example, a gesture may be performed using one or more fingers, a stylus, and/or a computer compatible pen.

Figure 3:
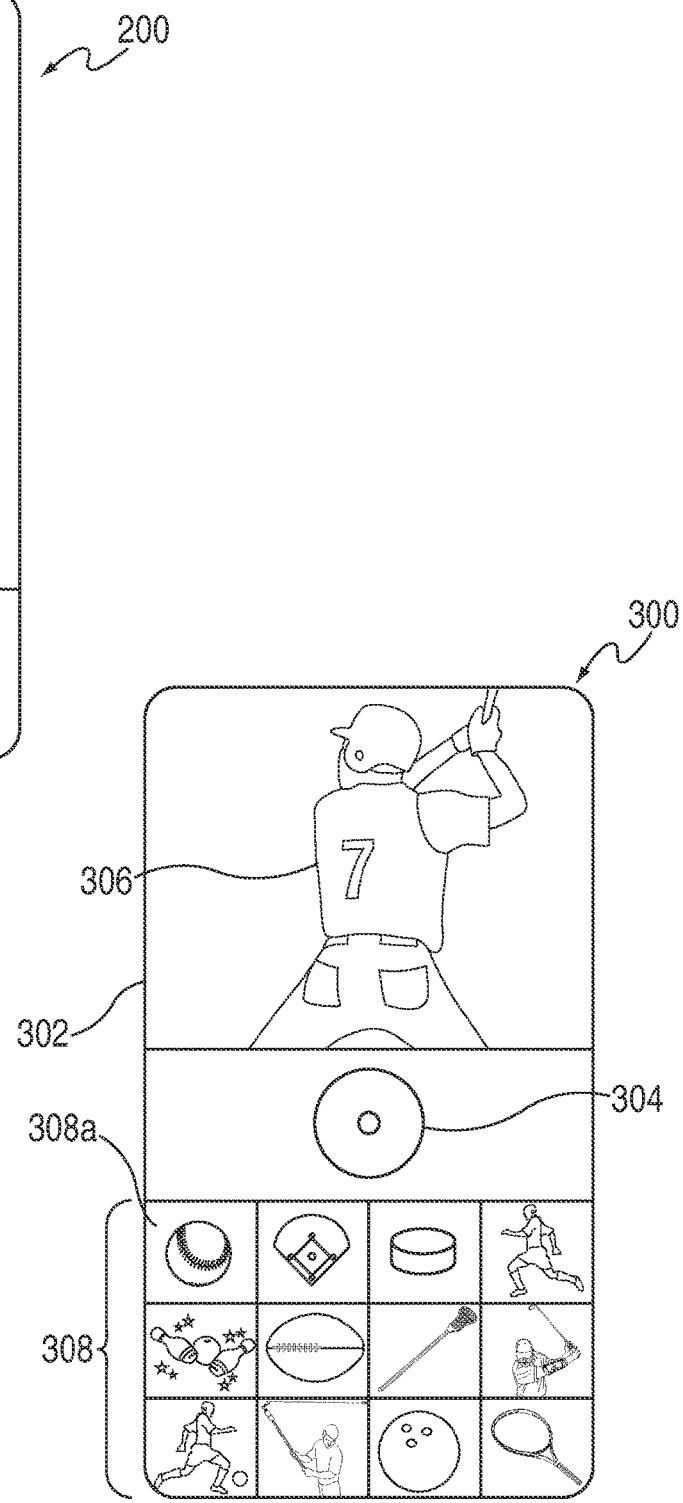
FIG. 3 shows a schematic illustration of a user interface displaying continuous real-time images and a collection of content items in accordance with various embodiments.

FIG. 3 shows a schematic illustration of a user interface displaying continuous real-time images and, in addition, a collection of content items in accordance with various embodiments. User interface 300 may include display interface 302, button 304, and image 306, which, in some embodiments, may be substantially similar to display interface 202, button 204, and image 206 of FIG. 2 and the previous description of the latter may apply to the former. In some embodiments, a user viewing continuous real-time images on a display interface of their user device (e.g., image 206 of FIG. 2), may desire to simultaneously view a collection of content items. For example, a user viewing a camera output may want to see one or more photo albums on their user device to determine if a captured image would be able to be placed there. In some embodiments, a user may provide one or more gestures detected with the display interface, which may enable the user to view both continuous real-time images and a collection of content items. Continuing the aforementioned example, the user may perform a flick on the display interface and, in response, both the continuous real-time images and a gallery of photographs may be displayed on the user interface.

In some embodiments, image 306 may occupy a smaller amount of user interface 300 after one or more gestures have been detected. In some embodiments, image 306 may have originally been in a "full screen" mode (e.g., image 206 of FIG. 2), however after one or more gestures have been detected, the user interface may include a portion displaying image 306 and a portion displaying collection of content items 308. Collection of content items 308 may be any collection of content items stored locally on the user device and/or externally on one more external devices, social media networks, and/or content management systems (e.g., content management system 100). For example, collection 308 may be a photo gallery located on the user device, and image 306 may be an image that the user wants to capture and include within collection 308.

In some embodiments, collection 308 and image 306 may be simultaneously viewed on display interface 302. This eliminates the need to switch back and forth between an image capturing mode and a content viewing mode. Collection 308 and image 306 (and button 304) may be displayed in any suitable manner within user interface 300. For example, collection 308 and image 306 may each take up half of the available display space provided by display screen 302. However, this is merely exemplary and any other partitioning scheme may be used (e.g., 60% collections/40% image, 80% image/20% collections, etc.).

Collection of content items 308 may include any number of content items and any type of content item. For example, collection 308 may include photographs captured by the image capturing component of the user device (e.g., camera 138). As another example, collection 308 may include videos captured by the image capturing component of the user device. Collection 308 may further include, but is not limited to, collections of images and/or videos stored on a content management system, images and/or videos stored on one or more social media networks, and/or images and/or videos stored on one or more third party applications. For example, collection 308 may include a collection of images stored within a user's account on a social media network. As another example, a collection of images stored within a user's authorized account on a content management system may be presented within collection 308, and/or downloaded to the user device and presented as collection 308.

In some embodiments, in response to a gesture being detected with display interface 302, collection 308 may be displayed along with image 306, where collection 308 and image 306 have one or more similar characteristics. In some embodiments, one or more modules on the user device may determine one or more features and/or characteristics associated with image 306. For example, a face detection module resident on the user device may analyze image 306 to determine if one or more faces are present within the image. If so, the face detection module may search a database of contacts with associated names and attempt to link a contact with the detected face. In some embodiments, the face detection module may ask the user to identify a contact for an unidentifiable face, and the face detection module may learn the new contact's facial features. In response to detecting the gesture, the user device may present a collection of content items including one or more of the same features and/or characteristics. For example, image 306 may correspond to a baseball player and collection 308 may include one or more content items associated with the baseball player and/or with baseball in general. The image may include associated metadata to aid in determining the same features and/or characteristics. For example, the image 306 may include associated metadata indicating geographical and/or temporal information corresponding to the image. The user device may process the geographical and/or temporal information in order to determine whether the user has attended or plans to be attending any events corresponding to the location and time of the captured image. In some embodiments, if the geographical and/or temporal information cannot be linked to any specific event, the device may attempt to learn the new event that the user may be attending based on the information. For example, the user may ask what event may be taking place within image 306 to attempt to link, for future reference or query, the location and/or time with the event. For example, content item 308a may be a baseball, for example, and may be displayed within collection 308 based on similar features determined from image 306. As another example, image 306 may include a family member or friend, and collection 308 may include one or more content items including an image of, or more generally associated with, the family member/friend.

Figure 4:
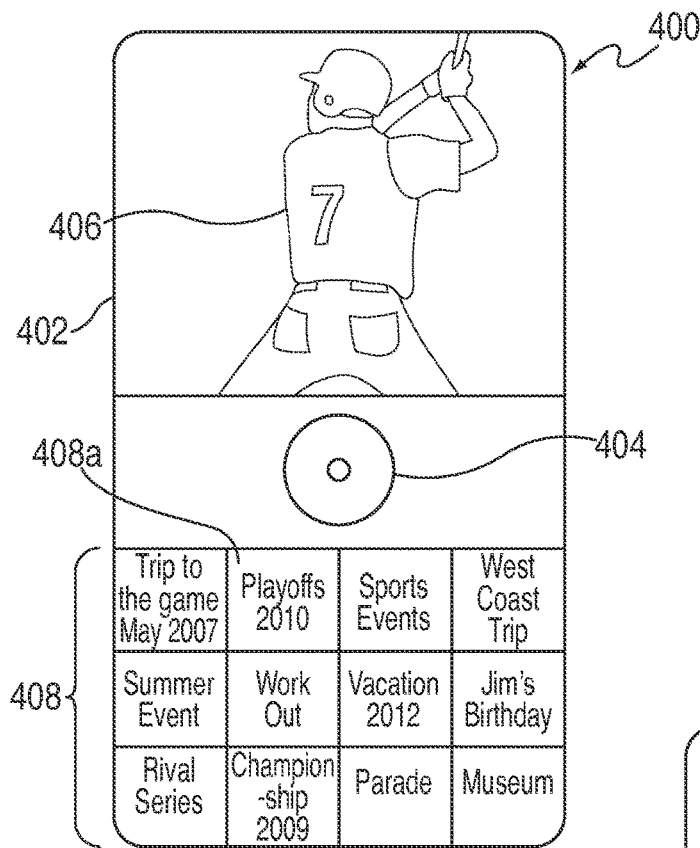
FIG. 4 shows a schematic illustration of a user interface displaying continuous real-time images and a collection of various collections of content items in accordance with various embodiments.

FIG. 4 shows a schematic illustration of a user interface displaying continuous real-time images and a collection of various collections of content items in accordance with various embodiments. User interface 400 may be displayed on display interface 402 and may include image 406, button 404, and collection of content items 408, which may be substantially similar to display interface 302, image 306, button 304, and collection of content items 308 of FIG. 3, and the previous description of the latter may apply to the former. In some embodiments, a gesture may be detected with display interface 402 that may alter user interface 400. For example, initially only image 406 may be displayed within user interface 400 on display interface 402. However, in response to detection of a gesture (e.g., a swipe, a flick, etc.), both image 406 and collection 408 may simultaneously be displayed on user interface 400.

In some embodiments, each content item included within collection 408 may itself be a collection of content items. Collection 408 may, in some embodiments, include collection of content items 408a, which may include one or more content items therein. For example, collection 408 may be a collection of various photo galleries. In this particular example, collection 408a may be one photo gallery that may include one or more photographs and/or videos. In some embodiments, collection 408 may display titles corresponding to each included collection. For example, collection 408a may be a photo gallery including photographs and/or videos from the user's trip to see a baseball team's playoff game/series, and the title may state such a scenario. In some embodiments, collection 408 may display one particular photograph from each collection (e.g., collection 408a) representing the collection. For example, an image of the user at a particular game from the team's playoff series may be used to represent that particular collection.

In some embodiments, a user may provide an additional gesture to select one or more collections from collection 408 and view the content items included within the one or more selected collections. For example, a user may perform a gesture selecting collection 408a and in response, the content items included within collection 408a may be displayed to the user on display interface 402. In some embodiments, the content items included within a particular collection may be simultaneously viewed with image 406. For example, if the user is attempting to capture image 406, the user may first look within a particular collection (e.g., collection 408a) to see if a similar image has already been captured.

Collection 408 may include various collections of content items stored locally on the user device, externally on a content management system, externally on a storage device, and/or externally on one or more social media networks. For example, collection 408a may be a photo gallery stored on the user device (e.g., files 110). The user may simultaneously view both image 406 and collection 408a, thus reducing the need to switch between an image capturing mode and a content viewing mode. In some embodiments, the user may be required to provide account authorization information to access a collection stored externally (e.g., social media network gallery, content management system gallery). For example, collection 408a may correspond to a collection of images stored within a user's social media network account. After the user authorizes user interface 400 to access their account, one or more collections of images stored within the social media network may be viewed from within collection 408 and/or downloaded to the user device. For example, the user may have their honeymoon pictures stored on their social media network profile. Upon access being granted to the social media network, the user's honeymoon pictures may be displayed within collection 408 through the social media network (e.g., through a connection to the social media network server) and/or downloaded directly to the user device and displayed within collection 408.

In some embodiments, image 406 may correspond to a music item, a text item, a video item, or any other content item type. In some embodiments, collection 408 may correspond to a collection of similar content item types, content item directories associated with the content item type of image 406, or any other collection of content items. For example, image 406 may be an image corresponding to a song playing on a music player on the user device. In this scenario, collection 408 may include various playlists, each including one or more additional songs. Collection 408*a*, for example, may be one particular playlist that includes the song corresponding to image 406. As another example, image 406 may correspond to a text item and collection 408 may include various text item directories or text item collections. Collection 408*a*, for example, may be one particular directory that may include a path to access the text item corresponding to image 406. In some embodiments, a live audio clip that may be captured and/or played, may be presented instead of image 406, and collection 408 may correspond to one or more playlists or related audio clips of the audio clip.

Collection 408 may display collections of content items in a grid view, a list view, a slide show view, or using any other presentation means. In some embodiments, collection 408 may show complete images of the collections included therein. In some embodiments, once a user performs a gesture to simultaneously display collection 408 along with image 406, a predefined number of items may be displayed within collection 408. For example, in response to detecting the gesture, collection 408 may display twelve (12) collections of content items within user interface 400 as shown, however persons of ordinary skill in the art will recognize that any number of collections may be displayed.

In some embodiments, one or more features, characteristics, and/or attributes associated with image 406 may be determined by the user device. The one or more features, characteristics, and/or attributes may be used to display collections of content items including similar features, characteristics, and/or attributes. In some embodiments, the collections of content items may be displayed in a hierarchal manner based on an amount of matching features. For example, a contact of the user may be determined to be included within image 406, and collection 408 may present various photo galleries including the determined contact. The photo galleries may also be displayed to the user in a grid or list according to the amount of photographs within each gallery that include the contact, essentially using a "matching score" or "relevance score". In some embodiments, the user device may include one or more relevancy algorithms. The relevancy algorithm may be any algorithm that determines an amount of photographs within a collection that correspond to a specific item or items (e.g., a contact). For example, the relevancy algorithm may scan all galleries to determine how many images within each gallery include images containing a particular contact. In this scenario, galleries of images that include a large number of images with that contact would receive a high relevancy score, and thus be presented more prominently in the grid or list. Conversely, galleries that include a small number of images with that contact may receive a low relevancy score, and be presented with less prominence as compared to the galleries having a high relevancy score. Thus, for example, if every photograph within a gallery includes an image having the contact therein, the gallery may be displayed towards the top and/or beginning of collection 408. Persons of ordinary skill in the art will recognize that any algorithm or algorithms may be run to determine a relevancy score, and any item may be used to determine a particular collection or set of collections relevancy score, and the use of determining an amount of images including a particular contact is merely exemplary.

Figure 5:
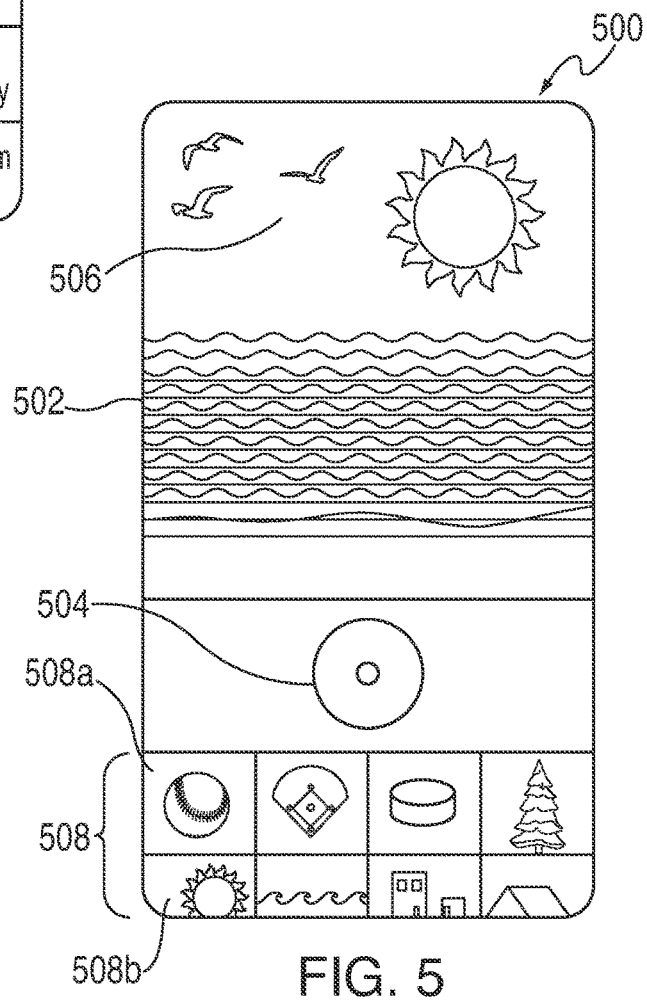
FIG. 5 is a schematic illustration of a user interface displaying continuous real-time images and at least a portion of a collection of content items in accordance with various embodiments.

FIG. 5 shows a schematic illustration of a user interface displaying continuous real-time images and at least a portion of a collection of content items in accordance with various embodiments. User interface 500 may be displayed on display interface 502, which may be substantially similar to display interface 202 of FIG. 2, and the previous description of the latter may apply to the former. User interface 502 may include image 506, button 504, and collection of content items 508. In some embodiments, image 506, button 504, and collection 508 may be substantially similar to image 306, button 304, and collection 308 of FIG. 3, and the previous description of the latter may apply to the former.

In some embodiments, collection 508 may include only a portion of a content item or items. In response to detecting a gesture with display interface 502, collection 508 may begin to be displayed. For example, a user may swipe a finger on the display interface, which may begin to display collection 508. As the swipe increases in duration and distance traveled on display interface 502, more of collection 508 may be displayed and the amount of display occupied by image 506 may correspondingly decrease.

Collection 508 may include content items 508*a* and 508*b*. Content item 508*a* may be fully displayed in a first row of collection 508. Content item 508*b* may be displayed in a second row of collection 508. In some embodiments, only a portion of content item 508*b* may be displayed. This may correspond to a user providing a gesture that only allows a full first row and a portion of a second row to be displayed. In some embodiments, collection 508 may include one row, a portion of one row, multiple rows and a portion of another row, or any other partition or segmentation, or any other combination thereof. In some embodiments, collection 508 may be displayed as a list of content items and portions of the list may be displayed within the user interface.

Figure 6:
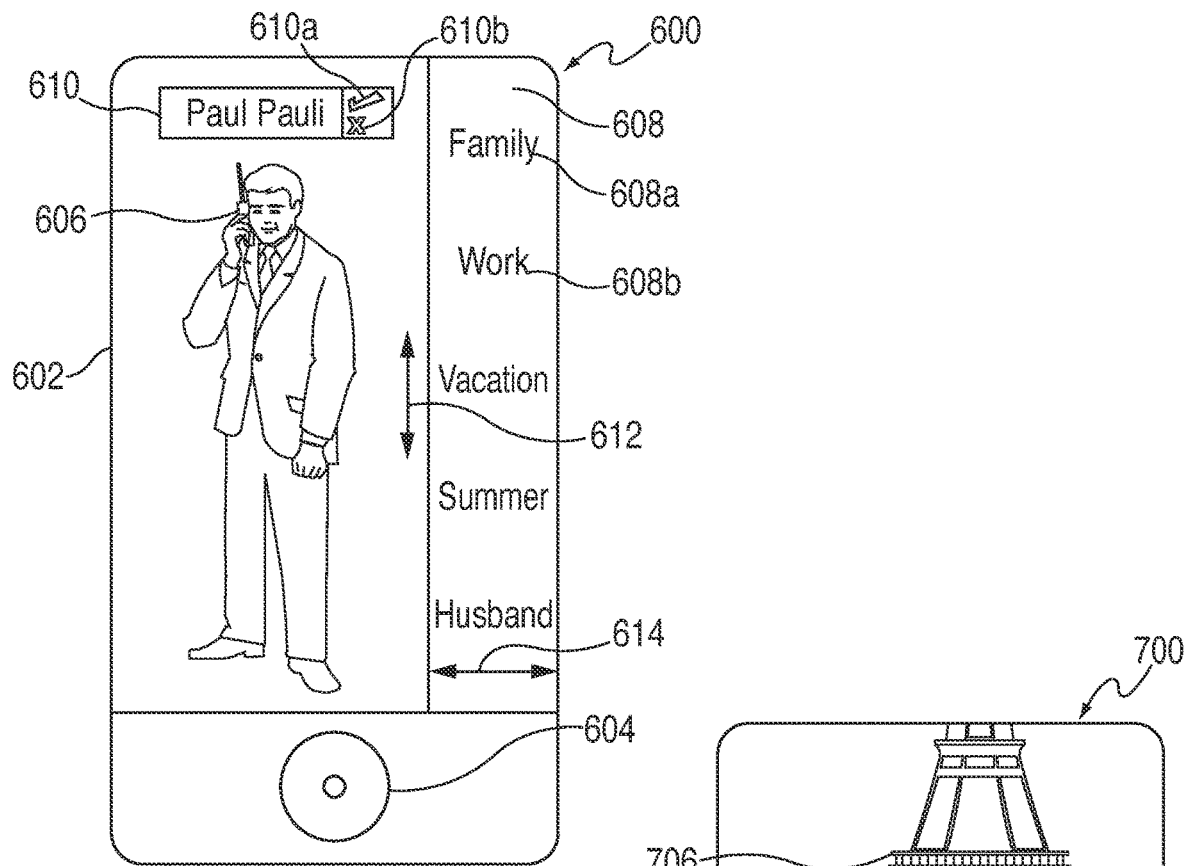
FIG. 6 shows another schematic illustration of a user interface displaying continuous real-time images and a collection of content items in accordance with various embodiments.

FIG. 6 shows another schematic illustration of a user interface displaying continuous real-time images and a collection of content items in accordance with various embodiments. User interface 600 may be displayed on display interface 602 and may include button 604. In some embodiments, display interface 602 and button 604 may be substantially similar to display interface 202 and button 204 of FIG. 2, and the previous description of the latter may apply to the former. User interface 600 may also include image 606. In some embodiments, image 606 may be substantially similar to image 206 of FIG. 2, with the exception that image 606 may be displayed in a substantially full screen mode along with collection of content items 608.

In some embodiments, collection of content items 608 may be substantially similar to collection of content items 308 of FIG. 3, with the exception that collection 608 may "pop-out" on display interface 602 in response to a gesture being detected. For example, a user may swipe a finger in the direction of arrow 614, which may cause collection 608 to appear on a side of display interface 602. In some embodiments, collection 608 may be substantially transparent, or partially so. This may allow the user to see "behind" collection 608, thus keeping the display space for image 606 constant. In some embodiments, collection 608 may include collections of content items. For example, collection 608 may include photo galleries 608*a* and 608*b*. Photo gallery 608*a* and 608*b* may each include one or more photographs and/or videos, and may each include one or more similar features corresponding to the collection with which they are included.

In some embodiments, collection 608 may be scrollable. Collection 608 may include multiple content items and/or collections of content items and the user may scroll through each one by providing one or more gestures that may be detected by display interface 602. For example, the user may swipe in either direction of dual sided arrow 612 to scroll through collection 608. This is merely exemplary, and persons of ordinary skill in the art will recognize that any gesture or combination of gestures may be used to scroll through collection 608.

In some embodiments, image 606 may correspond to the output received from one or more image capturing components on a user device. One or more processors on the user device may determine that image 606 includes a contact or contacts associated with the user of the user device. The determining may be performed using any suitable algorithm or recognition program, such as facial detection, image recognition, and/or a machine learning algorithm. In some embodiments, the determining may be performed on a content management system (e.g., content management system 100), and the results may be sent back to the user device. In some embodiments, an identification tag may appear in image 606 that may allow the user to positively identify the determined contact. Identification tag 610 may include the determined contact's name, or any other piece of contact information associated with the contact. The user may select check mark 610a if identification tag 610 positively corresponds to the correct contact, or select cross mark 610b if identification tag 610 negatively correspond to the appropriate contact. The identification tag may be stored on the user device and/or by the content management system, and may be used to dynamically update and learn which tags correspond to which contacts. Thus, anytime an image appears with the newly determined contact, the user device and/or the content management system may already "know" the user/users included therein.

In some embodiments, collection 608 may include content items and/or collections of content items (e.g., collections 608a and 608b) that correspond to the contact determined to be within image 606. For example, image 606 may include an image of the user's spouse and, in response to detecting a gesture, collection 608 may include galleries including additional images of the user's spouse. For example, collection 608a may be a collection of family photographs. Thus, if it is determined that image 606 includes an image of the user's spouse and/or children, collection 608a may appear towards the top of collection 608 to easily allow the user to place image 606 into that particular collection of content items upon capturing the image.

Figure 7:
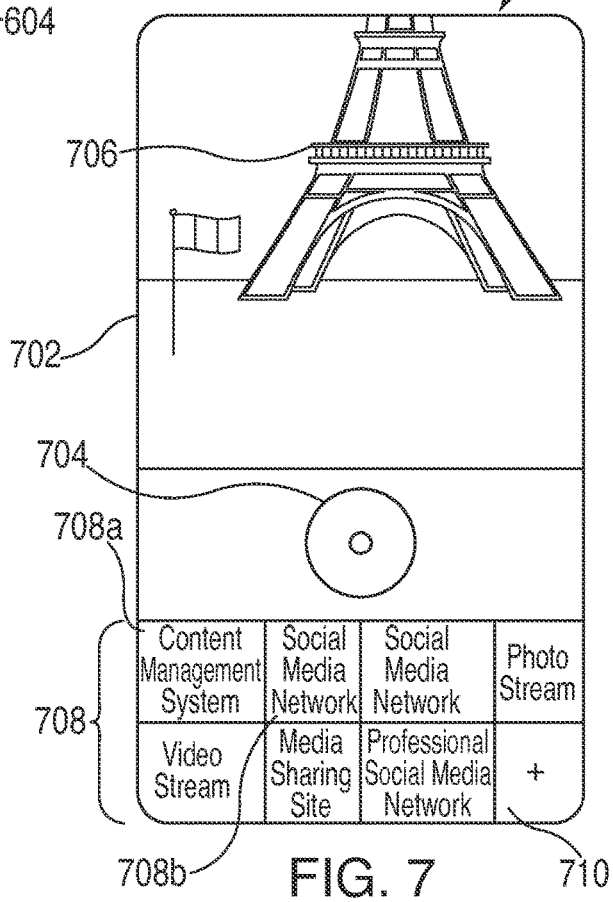
FIG. 7 shows a schematic illustration of a user interface displaying continuous real-time images and a collection of applications/modules in accordance with various embodiments.

FIG. 7 shows a schematic illustration of a user interface displaying continuous real-time images and a collection of applications/modules in accordance with various embodiments. User interface 700 may be displayed on display interface 702 and may include button 704 and image 706. In some embodiments, display interface 702, button 704, and image 706 may be substantially similar to display interface 302, button 304, and image 306 of FIG. 3, and the previous description of the latter may be applied to the former.

In some embodiments, image 706 may be displayed in a first region on display interface 702. The first region may include any percentage of available display on the display interface. For example, the first region may occupy 50%, 75%, or 100% of display interface 702. The first region may, in some embodiments, horizontally divide the display interface. For example, image 706 may occupy the upper portion of display screen 702. However, the first region may, in some embodiments, vertically divide the display interface. For example, image 606 of FIG. 6 may occupy a left or right portion of display interface 602.

User interface 700 may also include collection 708 displayed in a second region on display interface 702. The second region may include any percentage of available display on the display interface not already occupied by the first region. For example, if the first region occupies 60% of display interface 702, the second region may occupy up to 40% of the display interface. Furthermore, as mentioned above, the second region may divide the display interface horizontally or vertically. In some embodiments, the user may determine the orientation of the first and second region. In some embodiments, user interface 700 may include additional regions displayed on display interface 702, and the use of two regions is merely exemplary.

Collection 708 may be substantially similar to collection 608 of FIG. 6, with the exception that collection 708 may include various sharing applications and/or modules. In some embodiments, collection 708 may be displayed in response to one or more gestures being detected with display interface 702. For example, a user may swipe or flick in one or more directions on display interface 702, and in response to detecting the swipe or flick, collection 708 may be displayed. Collection 708 may include content items 708a and 708b which, in some embodiments, may correspond to one or more social media networks and/or content management systems. For example, content item 708a may correspond to a content management system, such as content management system 100. The user may provide one or more gestures selecting content item 708a enabling image 706 to be shared using the content management system. Similarly, a user may select content item 708b, which may correspond to a first social media network. A user may provide one or more gestures (e.g., a tap), to select the first social media network enabling image 706 to be shared using the first social media network.

Collection 708 may include any number of sharing applications and/or modules, and content items 708a and 708b may represent two exemplary embodiments. In some embodiments, the amount of content items (e.g., sharing applications/modules) included within collection 708 may be determined by the user of the user device. For example, the user may have authorized accounts on one or more content management systems and/or social media networks, and the user may include those accounts in collection 708, each as individual content items. In some embodiments, the user may add a content item, such as a social media network, to collection 708 using "+" button 710. Button 710 may be any button which may allow the user to select a sharing application/module to include within collection 708 so that images, such as image 706, may be shared using the sharing application/module. In some embodiments, by selecting button 710, the user may be prompted to input an account user name and password to authorize the user device to access the added sharing application/module. In some embodiments, once an account is authorized, user interface 700 may store the account information. For example, a user may log into their account on content management system 100, and the login credentials may be stored in memory on the user device. Thus, each time the user attempts to access the content management system within user interface 700 (e.g., to add one or more additional collections), the user may not be required to re-enter their account information. In this way, the user may directly and seamlessly share content that may be captured by the user device using one (or more) of the sharing applications/modules included within collection 708 without requiring additional log-in information or account authorization and/or having to switch between the image capturing mode and the sharing application/module mode.

Figure 8:
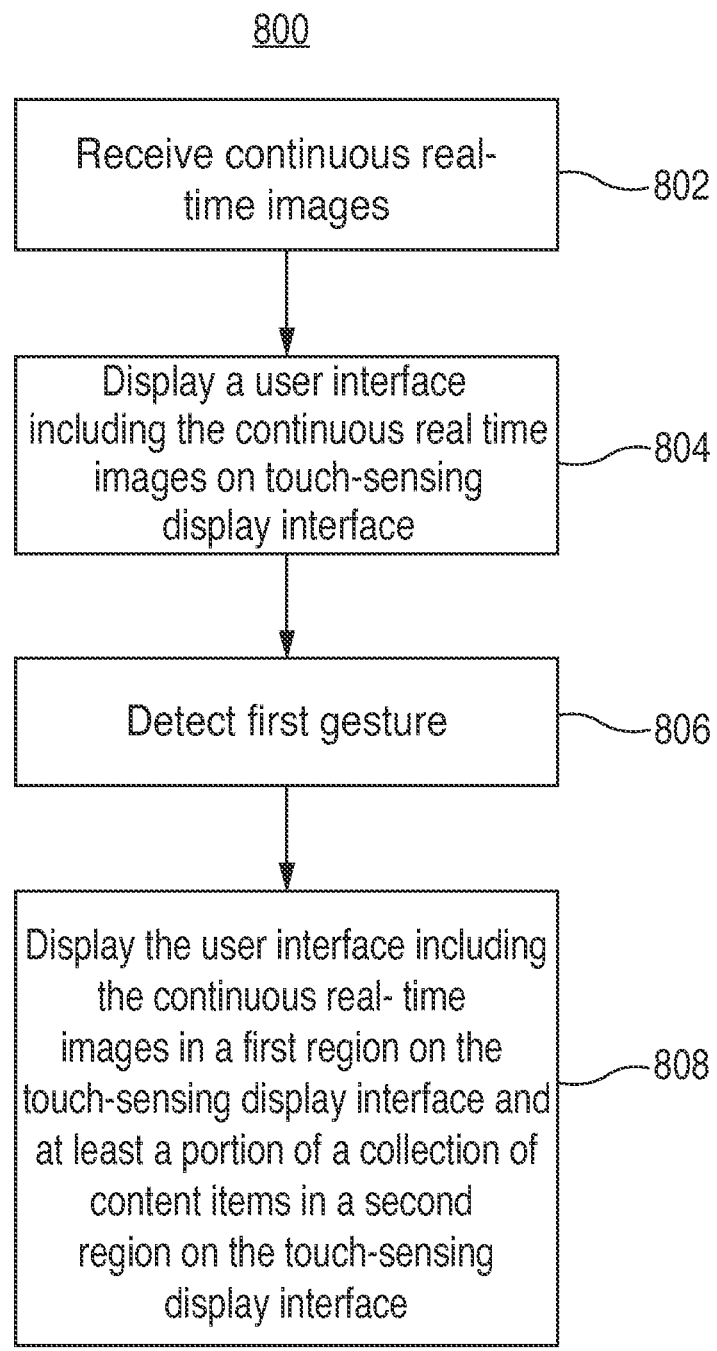
FIG. 8 shows an illustrative flowchart of a process for displaying a user interface including continuous real-time images and at least a portion of a collection of content items in accordance with various embodiments.

FIG. 8 shows an illustrative flowchart of a process for displaying a user interface including one or more captured images and at least a portion of a collection of content items in accordance with various embodiments. Process 800 may begin at step 802. At step 802, continuous real-time images may be received using an image capturing component on a user device. The image capturing component may capture live videos, live images, continuous-real time images, continuous images, recorded images, or any other type of image, or any combination thereof. In some embodiments, a user device may include one or more image capturing components, such as cameras. For example, user devices 102 may include one or more instances of camera 138 corresponding to a front facing camera and/or a rear facing camera. The camera(s) may be capable of capturing still images, sequential images (e.g., multi-shots), and/or videos. In some embodiments, the image capturing components may be capable of capturing high-definition ("HD") images, 3-D images, zoomed-in images, or any other type of image, or any combination thereof. In some embodiments, the image capturing component may be located external to the user device. For example, the image capturing component may be an auxiliary web-camera, digital camera, digital video camera, and/or a scanned or converted image from an analog camera.

At step 804, the continuous real time images may be included within a user interface displayed on a display interface. In some embodiments, the continuous real-time images may be the images captured by the image capturing component of the user's user device. The display interface may be any display interface capable of displaying at least one image and/or a user interface. Various display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the display interface may include a multi-touch panel coupled to one or more processors to receive gestures. Multi-touch panels, for example, may include capacitive sensing mediums having a plurality of row traces or driving line traces, and a plurality of column traces or sensing lines. Although multi-touch panels are described herein as one example for display interface, persons of ordinary skill in the art will recognize that any display interface may be used. In some embodiments, receiving the continuous real time images and displaying the continuous real-time images on the display interface may occur at a substantially same time. For example, a user may be pointing their device (e.g., their camera) and the image captured by the device may be viewed on the display interface in real-time. This may allow the user to use the display interface as a view-finder prior to capturing the image (e.g., prior to taking a picture).

At step 806, a first gesture may be detected with the display interface. Various gestures may include, but are not limited to, swipes, flicks, taps, finger rolls, hand waves, hoverings, voice commands, eye tracking, long presses, or any other gesture, or any combination thereof. In some embodiments, the first gesture may be performed by one or more fingers, a stylus, a computer compatible pen, or any other object capable of interfacing with the user device and/or the display interface.

At step 808, the continuous real-time images may be included within a first region of the user interface and at least a portion of a collection of content items may be included within a second region of the user interface displayed on the display interface. For example, display interface 302 of FIG. 3 may display image 306 in a first region and collection 308 in a second region. The first region and the second region of the user interface may be displayed on the display interface in any suitable matter. For example, image 306 may be displayed in a first region which divides user interface 300 horizontally. As another example, image 606 of FIG. 6 may be displayed in a first region which divides user interface 600 vertically. The first region and the second region may each occupy any amount of the user interface (e.g., 50%/50%, 60%/40%, 80%/20%, etc.). In some embodiments, one or more additional regions may be displayed within the user interface on the display interface. For example, a first region may occupy an upper portion of the user interface while a second and a third region may both occupy a lower portion. The second and third region may be divided such that the second region occupies a left lower portion and the third region occupies a right lower portion.

In some embodiments, an entire collection of content items, a predefined amount of content items, or a portion of one or more content items may be displayed within the second region. For example, collection 408 of FIG. 4 may include a user's entire collection of photo galleries stored on the user device. As another example, collection 308 of FIG. 3 may include some content items from a collection of content items. As still another example, collection 508 of FIG. 5 may include content items from a collection of content items, including a portion of one or more content items. Content item 508a may be a photograph that may be displayed within collection 508. Content item 508b may also be a photograph displayed within collection 508, with the exception that only a portion of content item 508b may be displayed. In some embodiments a user may be required to provide one or more additional inputs (e.g., a swipe) to display the full image 508b instead of just the displayed portion.

In some embodiments, the first and second regions may be displayed in response to the gesture being detected. For example, one or more processors on user device 102 may detect a gesture, such as a swipe, and in response, change the display from just the captured image to a display of both the captured image and a collection of content items. This may allow a user to simultaneously view both the image that may be placed in the collection of content items, and the content items currently included therein. Thus, the user may not have to switch between the image capture mode and the content view mode.

In some embodiments, the detected first gesture may "pull-up" the collection of content items. For example, prior to the gesture being detected, the user interface may display the received image in a full-screen mode. In the full-screen mode, most, if not all, of display interface may display the received live images. In some embodiments, as the user performs the gesture, the collection of content items may gradually encompass more and more of the display interface. For example, collection 508 of FIG. 5 may include a first row of content items and a second row of content items. Only a portion of the second row may be displayed (e.g., content item 508b), for example. The region displaying image 506, however, may become smaller than it was prior to the gesture being performed and collection 508 being displayed. After the user finishes performing the gesture, a predefined amount of content items or an entire collection may be displayed on the display interface with the continuous real-time images.

In some embodiments, the collection of content items may "pop-up" on the display interface in response to the gesture being detected. For example, the user may perform the gesture on display interface 602 and, in response, collection 608 may "pop" out from a side of user interface 600. In some embodiments, an additional gesture may be performed that may cause the collection to recede back and no longer be displayed. In other embodiments, the collection may, after a defined time, automatically recede until another gesture is performed, functioning as an "auto-hide" feature does on many computer displays. In some embodiments, the collection may be substantially transparent, or partially so, to allow the image to still be displayed in a substantially full screen mode. For example, prior to the gesture being detected with display interface 602, image 606 may be displayed in a full screen mode. However, in response to the gesture being detected, collection 608 may pop out in the direction of arrow 614. Collection 608 may be substantially or partially transparent allowing image 606 to remain displayed in a substantially full screen mode even though collection 608 may also be viewable.

In some embodiments, the collection may be scrollable to allow the user to view various content items included within the collection. For example, collection 608 of FIG. 6 may include various galleries of photographs. The user may scroll through the galleries to determine which gallery image 606, if captured, may be placed. In some embodiments, the user may provide one or more additional gestures to scroll through the collections. For example, the user may provide a gesture (e.g., a swipe) in the direction of dual-sided arrow 612 to view additional content items and/or collections of content items.

In some embodiments, one or more processors included on the user device may detect and/or may be used in an algorithm to detect, one or more features within the continuous real-time images and display one more content items and/or collections of content items associated with the one or more features. For example, software resident on a user device that may display user interface 600 of FIG. 6 may also include one or more facial recognition algorithms. Image 606 may be displayed on display interface 602 and the one or more facial recognition algorithms may detect a face therein. In some embodiments, the detected face may correspond to a contact of a user of the device, a social media network contact, and/or a contact associated with an authorized account on a content management system (e.g. content management system 100). In response to determining the face as being that of a contact, one or more collections of content items also including and/or associated with the determined contact may be displayed within collection 608. In some embodiments, identification tag 610 may appear within image 606 allowing the user to provide confirmation that the facial recognition algorithms have properly identified the contact. For example, if the facial recognition algorithm correctly identifies the contact displayed within image 606, the user may select check mark 610*a*, and the system may update and learn additional features corresponding to that contact. This may improve future facial recognition attempts and/or information associated with the contact and the possible collections of content items he/she may be associated with. If the algorithms incorrectly identify the contact, the user may select cross mark 610*b*, and the identified contact may not identified as being associated with the determined face/image.

In some embodiments, each content item included within the displayed collection of content items may itself be a collection of content items. For example, collection 408 of FIG. 4 may include content item 408*a*. Content item 408*a* may be a photo gallery including one or more photographs. Content item 408*a* may be a media gallery including content items of multiple media formats including, but not limited to, photographs, videos, textual documents, slide shows, short-clip images, or any other media file, or any combination thereof. In some embodiments, the displayed collection may include both collections of content items and various content items. For example, collection 408*a* may include photographs and photo galleries.

Figure 9:
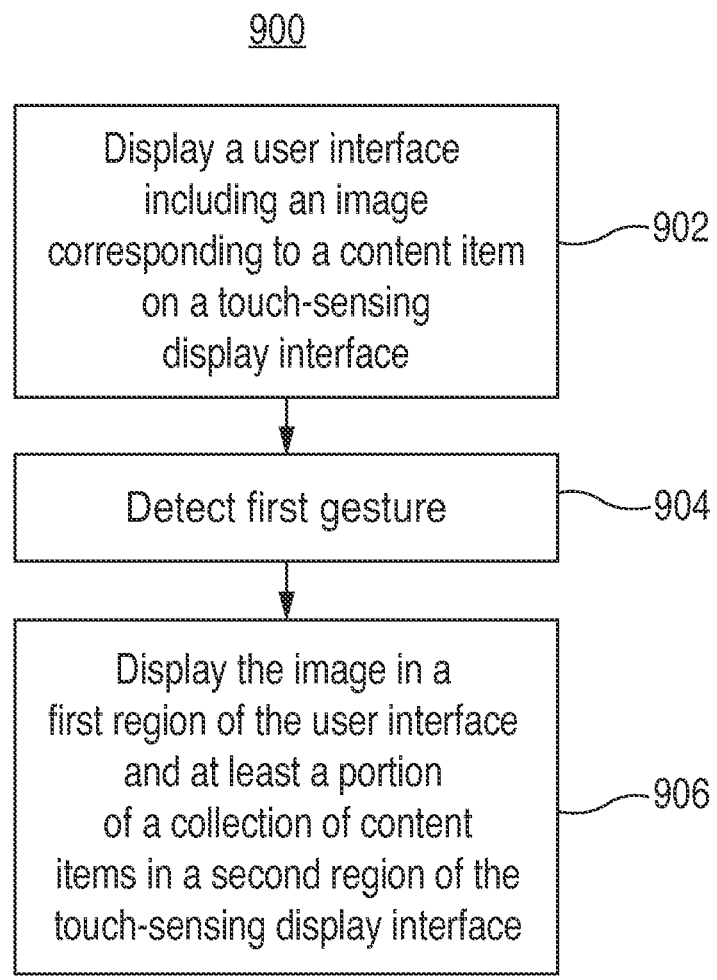
FIG. 9 shows an illustrative flowchart of a process for displaying a user interface including an image and at least a portion of a collection of content items in accordance with various embodiments.

FIG. 9 shows an illustrative flowchart of a process for displaying a user interface including an image and at least a portion of a collection of content items in accordance with various embodiments. Process 900 may begin at step 902. At step 902, an image corresponding to a content item may be displayed on a display interface. For example, image 206 of FIG. 2 may correspond to an image associated with a music file. The image may be cover art corresponding to the album the music file is a part of, and/or any other image which may be chosen by the user. As the music file plays on a user device, image 206 may be displayed on display interface 202. In some embodiments, as the music file plays, image 206 may change to a different image or images. The aforementioned example is merely illustrative, and the displayed image may correspond to any content item. For example, the image may correspond to a slide from a slideshow, an image corresponding to a document, a thumbnail of a movie, or any other image, or any combination thereof. At step 904, a first gesture may be detected with the display interface. In some embodiments, step 904 of FIG. 9 may be substantially similar to step 806 of FIG. 8, and the previous description of the latter may apply to the former.

At step 906, the image corresponding to the content item may be included in a first region of the user interface and at least a portion of a collection of content items may be included in a second region of the user interface displayed on the display interface. In some embodiments, step 906 of FIG. 9 may be substantially similar to step 808 of FIG. 8, and the previous description of the latter may apply to the former. In some embodiments, in response to detecting the first gesture, the image corresponding to the content item and the collection of content items may both be displayed within the user interface. The collection of content items may be related to the image in some embodiments. For example, the collection of content items may include the content item associated with the image. In some embodiments, the collection of content items may correspond to additional music items included within a playlist that also includes the song corresponding to the displayed image. For example, a user may be playing a specific song that has a specific piece of cover art associated with it. In response to detecting the gesture, the additional music items within the playlist the song resides in may be displayed to the user.

Continuing the above example involving a music item—in response to detecting the gesture on the display interface, the image corresponding to the music item and a playlist of music items may both be displayed. The playlist may include the music file whose image currently may be displayed. The playlist may also include other music content items featuring similar attributes as the music file corresponding to the image. For example, the music file may have metadata indicating a certain musician, genre, and/or a specific playlist of songs, and in response to detecting the gesture, the playlist may be displayed including music items also including the metadata.

Figure 10:
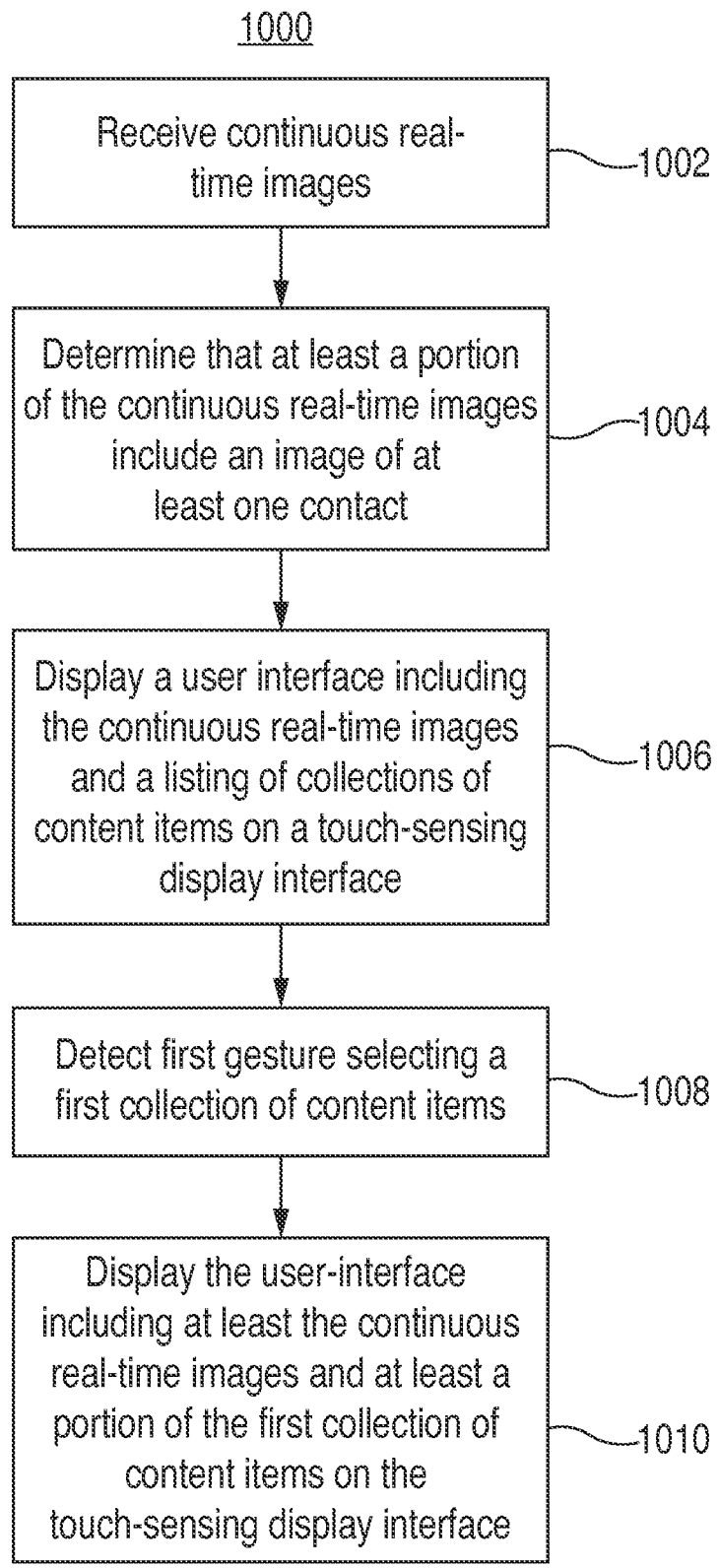
FIG. 10 shows an illustrative flowchart of a process for displaying a user interface including continuous real-time images and at least a portion of a collection of content items based on one or more determined contacts within the continuous real-time images in accordance with various embodiments.

FIG. 10 shows an illustrative flowchart of a process for displaying a user interface including continuous real-time images and at least a portion of a collection of content items based on one or more determined contacts associated with the continuous real-time images in accordance with various embodiments. Process 1000 may begin at step 1002. At step 1002, continuous real-time images may be received using an image capturing component on a user device. In some embodiments, step 1002 of FIG. 10 may be substantially similar to step 802 of FIG. 8, and the previous description of the latter may apply to the former.

At step 1004, a determination may be made as to whether at least a portion of the received continuous real-time images includes an image of one or more of the user's contacts. In some embodiments, one or more facial recognition algorithms may detect one or more contacts' faces within the received continuous real-time images. For example, as a user views continuous real-time images 606 of FIG. 6, one or more facial recognition algorithms included within the device and/or built in to a stand-alone application may detect that a contact associated with the user may be displayed within image 606. In some embodiments, an identification tag, such as identification tag 610, may appear within image 606 identifying the one or more determined contacts within image 606 to the user. In some embodiments, various algorithms located within the user device and/or within the application may use various metadata attributes to associate the image with a contact or contacts and/or with a certain collection of content items. In some embodiments, metadata may be determined to be included within image 606 indicating a timestamp, a location, an orientation, or any other attribute characterizing image 606. For example, image 706 may include metadata indicating that image 706 (or the device capturing image 706) may be located in Paris, France.

At step 1006, the continuous real-time images and a listing of collections of content items may both be included within a user interface displayed on the display interface. In some embodiments, step 1006 of FIG. 10 may be substantially similar to step 808 of FIG. 8, with the exception that the user interface may be displayed in response to the determination of the contact within the received images. For example, in response to detecting a face of one or more contacts within image 606 of FIG. 6, collection 608, which may include content items associated with the one or more contacts, may automatically be displayed in user interface 600 along with image 606. For example, if image 606 includes an image of the user's spouse, collections of content items also including the user's spouse, or the user's family, and/or are associated with the user's spouse/family may be displayed. Collections may include photographs of the user's family, photographs of the user's spouse, and/or photographs of the user and the user's spouse. In some embodiments, a point of interest may be two or more contacts, or any other piece of relevant information. For example, image 606 may be determined to include multiple contacts and/or a contact and a specific location. A relevancy module may "grade" each collection to determine which collection has the highest relevancy to the image. If, for example, the image includes multiple contacts, the relevancy score may be based on which collection has the highest relevancy irrespective of both contacts or corresponding to one of the contacts. Thus, a collection including twenty (20) images may include ten (10) that include a first contact and five (5) images that include the second contact. If the images including the first contact are separate from the images including the second contact, then the relevancy score for the combined grouping may be high (e.g., 75% matching). However, another collection may include twelve (12) images of the first contact and no images of the second contact. This collection may receive a slightly lower relevancy score for the combined contacts (e.g., 60%), however a higher relevancy score for the first contact (e.g., 60% compared to 50%).

At step 1008, a first gesture may be detected that selects a first collection of content items from the displayed collection of content items. Step 1008 of FIG. 10 may be substantially similar to step 806 of FIG. 8 with the exception that the first gesture may select a first collection of content items. In some embodiments, the selection of the first collection of content items may be based on the relevancy of a particular collection to the detected contact. For example, if a certain collection of content items includes a large amount of content items associated with the detected contact, this collection may be highlighted, displayed with a certain relevancy score, and/or displayed with amount of associated content items included therein.

At step 1010, at least the continuous real-time images and at least a portion of the first collection of content items may be displayed within the user interface on the display interface. For example, the first collection of content items selected via the first gesture may be displayed along with the continuous real-time images captured using the image capturing component on the user's user device. In some embodiments, one or more additional collections of content items may also be displayed with the continuous real-time images and the selected collection. In some embodiments, a previously captured image may also be displayed along with the continuous real-time images and the selected collection. This may allow the user to compare images within a collection with a captured image to determine if the image is a duplicate.

Figure 11:
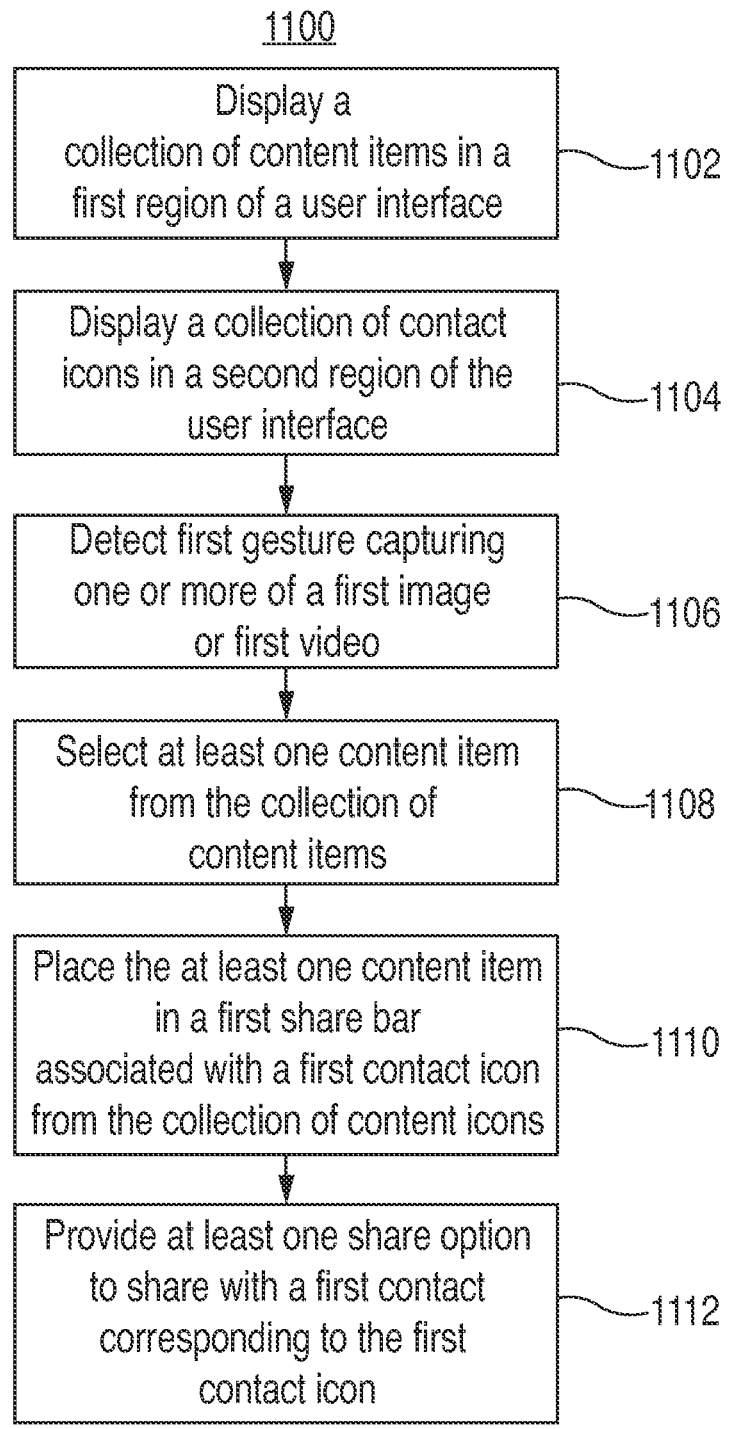
FIG. 11 shows an illustrative flowchart of a process for capturing an image and/or a video from continuous real-time images and displaying a user interface including the continuous real-time images and at least a portion of a collection of content items in accordance with various embodiments.

FIG. 11 shows an illustrative flowchart of a process for capturing an image and/or a video from continuous real-time images and displaying, within a user interface, both the continuous real-time images and at least a portion of a collection of content items in accordance with various embodiments. Process 1100 may begin at step 1102. At step 1102, continuous real-time images may be received using an image capturing component on a user device. At step 1104, the continuous real time images may be displayed on a display interface. Steps 1102 and 1104 may, in some embodiments, be substantially similar to steps 802 and 804 of FIG. 8, and the previous description of the latter may apply to the former.

At step 1106, a first gesture may be detected with the display interface that captures at least one of a first image and a first video from the received continuous real-time images. Various gestures may include, but are not limited to, swipes, flicks, taps, finger rolls, hand waves, hoverings, voice commands, eye tracking, long presses, or any other gesture, or any combination thereof. In some embodiments, the first gesture may be substantially similar to the first gesture detected in step 806 of FIG. 8, with the exception that the first gesture captures either a first image or a first video from the continuous real-time images.

In some embodiments, the user may press a button located on the user interface to capture the first image and/or the first video. For example, the user may tap button 204 of FIG. 2, which may capture image 206 displayed on user interface 200. In some embodiments, different gestures may correspond to capturing either an image or a video. For example, a short, quick tap may correspond to capturing an image whereas a long press may correspond to capturing a video. This however is merely exemplary, and persons of ordinary skill in the art will recognize that any gesture or combinations of gestures may be used to capture and/or differentiate between capturing images and videos.

In some embodiments, after the first image and/or the first video is captured, the first image and/or video may be temporarily stored in cache memory on the user device or placed in a specific collection of content items. For example, the user may capture a photograph of image 306, which may be placed in collection 308 until a further action occurs. In this scenario, collection 308 may not be displayed on display interface 302, and instead, image 306 may be placed in collection 308 without the user having to be physically aware. For example, collection 308 may correspond to a collection of recently captured images, and thus any new image and/or video captured may directly and/or automatically be placed in collection 308.

At step 1108, a second gesture may be detected with the display interface. Step 1108 of FIG. 11 may, in some embodiments, be substantially similar to step 806 of FIG. 8, with the exception that step 1108 may correspond to a second gesture that may be performed. In some embodiments, the first gesture and the second gesture may be substantially similar. For example, the first gesture may be a tap performed on display interface 202 of FIG. 2, and the second gesture may also be a tap. However, in some embodiments, the first gesture and the second gesture may be substantially different. For example, the first gesture may be a tap capturing image 206, whereas the second gesture may be a swipe.

At step 1110, at least the continuous real time images may be included within a first region of the user interface and a collection of applications may be included within a second region of the user interface displayed on the display interface. In some embodiments, the captured first image and/or first video may be placed in one or more of the collections of applications. The captured first image and/or first video may, in some embodiments, be placed in the one or more applications in response to the second gesture being detected. For example, in response to detecting the second gesture, captured image 706 of FIG. 7 may be placed in sharing application 708a (e.g., content management system).

In some embodiments, the captured image may be displayed along with the received continuous real-time images and the collection of applications. For example, the continuous real-time images may be displayed in the first region, the collection of applications may be displayed in the second region, and the captured image may be displayed in a third region of the user interface. This may allow the user to simultaneously view the image he/she captured as well as the real-time images "side-by-side". The user may be able to decide whether or not to place the captured image in one of the applications or discard the captured image and capture a new image.

Figure 12:
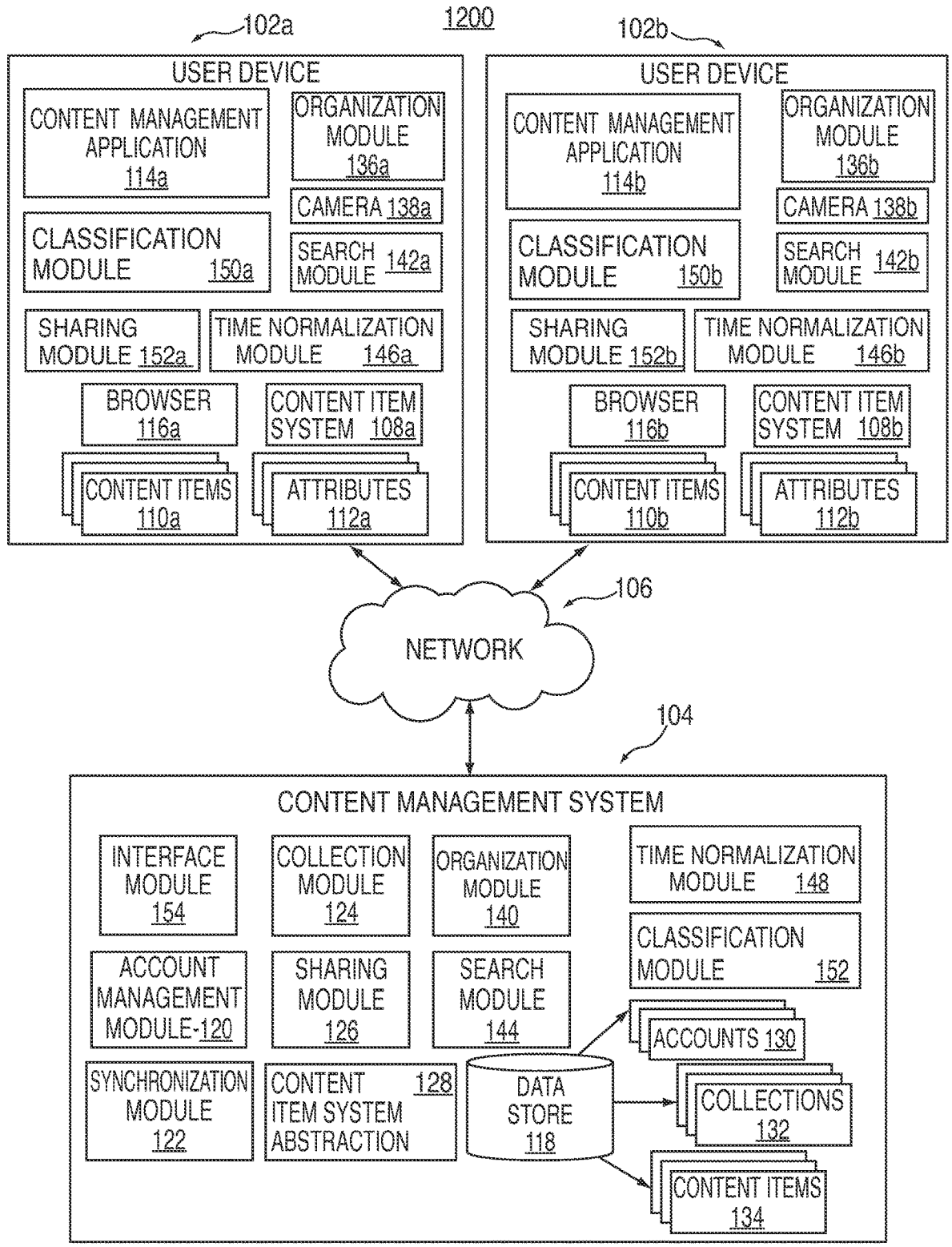
FIG. 12 is another exemplary system in accordance with various embodiments.

FIG. 12 shows an exemplary system in accordance with various embodiments. In some embodiments, system 1200 of FIG. 12 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112a and 112b may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114a and 114b (collectively 114), client application, and/or third-party application may be implemented on user devices 102a and 102b, respectively, to provide a user interface to a user for interacting with content management system 104. Content management application 114 may expose the functionality provided with content management interface module 154 and accessible modules for user device 102. Web browser 116a and 116b (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time.

Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for displaying an image capturing mode and a content viewing mode, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

We claim:

1. A system comprising:
   at least one processor; and
   at least one non-transitory computer-readable storage medium storing instructions that, when executed by the at least one processor, cause the system to:
   analyze an image to detect a face within the image;
   access a database of contacts associated with a user to identify a contact that corresponds to the face within the image;
   identify a plurality of images comprising the face that corresponds to the contact;
   generate a first collection of images comprising the plurality of images comprising the face that corresponds to the contact;
   identify one or more additional collections of images that comprise at least one image of the plurality of images comprising the face that corresponds to the contact, wherein the one or more additional collections of images are respectively associated with a time-based event or a location-based event; and
   provide, for presentation on a client device corresponding to the user, the first collection of images comprising the plurality of images comprising the face that corresponds to the contact and the one or more additional collections of images that comprise at least one image of the plurality of images comprising the face that corresponds to the contact.

2. The system of claim 1, wherein the database of contacts comprises a plurality of contact images associated with at least one of a plurality of contact names.

3. The system of claim 2, further comprising instructions that, when executed by the at least one processor, cause the system to:
   determine one or more features of the face within the image; and
   compare the one or more features of the face within the image to features of images within the plurality of contact images to identify a contact image from the plurality of contact images based on related features between the image and the contact image.

4. The system of claim 3, further comprising instructions that, when executed by the at least one processor, cause the system to assign a contact name associated with the contact image to the image.

5. The system of claim 4, further comprising instructions that, when executed by the at least one processor, cause the system to generate metadata for the image that indicates the contact name.

6. The system of claim 4, wherein generating the first collection of images comprising the plurality of images is based on the first collection of images comprising the plurality of images being associated with the contact name.

7. The system of claim 1, wherein providing, for presentation on the client device corresponding to the user, the first collection of images comprising the plurality of images and the one or more additional collections of images is based on receiving a search query comprising a contact name.

8. The system of claim 1, wherein the database of contacts comprises contacts associated with an account of the user on a content management system.

9. The system of claim 1, wherein identifying the contact that corresponds to the face within the image comprises:
   determining the face within the image is unidentifiable with respect to contacts within the database of contacts based on a comparison of the image to a plurality of contact images within the database of contacts; and
   providing a prompt for the user to identify the contact that corresponds to the face within the image.

10. A method comprising:
    analyzing, by at least one processor, an image to detect a face within the image;
    accessing a database of contacts associated with a user to identify a contact that corresponds to the face within the image;
    identifying a plurality of images comprising the face that corresponds to the contact;
    generating, by the at least one processor, a first collection of images comprising the plurality of images comprising the face that corresponds to the contact;
    identifying one or more additional collections of images that comprise at least one image of the plurality of images comprising the face that corresponds to the contact, wherein the one or more additional collections of images are respectively associated with a time-based event or a location-based event; and
    providing, for presentation on a client device corresponding to the user, the first collection of images comprising the plurality of images comprising the face that corresponds to the contact and the one or more additional collections of images that comprise at least one image of the plurality of images comprising the face that corresponds to the contact.

11. The method of claim 10, further comprising using a machine learning algorithm to identify the contact that corresponds to the face within the image.

12. The method of claim 11, further comprising providing, for presentation to a user, a selectable prompt to confirm the contact corresponds to the face within the image.

13. The method of claim 12, further comprising receiving, based on the user interacting with the selectable prompt, a positive confirmation that the face within the image corresponds to the contact.

14. The method of claim 13, further comprising updating the machine learning algorithm based on receiving the positive confirmation that the face within the image corresponds to the contact.

15. The method of claim 12, wherein identifying the contact that corresponds to the face within the image comprises:
  receiving, based on a user interaction with the selectable prompt, a negative confirmation that the face within the image corresponds to a preliminary contact; and
  in response to receiving the negative confirmation, providing an additional prompt for user input to identify the contact that corresponds to the face within the image.

16. The method of claim 15, further comprising updating the machine learning algorithm based on receiving the negative confirmation that the face within the image corresponds to the preliminary contact.

17. A non-transitory computer readable medium storing instructions thereon that, when executed by at least one processor, cause a computer device to:
  analyze an image to detect a face within the image;
  access a database of contacts associated with a user to identify a contact that corresponds to the face within the image;
    identify a plurality of images comprising the face that corresponds to the contact;
    generate a first collection of images comprising the plurality of images comprising the face that corresponds to the contact;
    identify one or more additional collections of images that comprise at least one image of the plurality of images comprising the face that corresponds to the contact, wherein the one or more additional collections of images are respectively associated with a time-based event or a location-based event; and
  provide, for presentation to the user, the first collection of images comprising the plurality of images comprising the face that corresponds to the contact and the one or more additional collections of images that comprise at least one image of the plurality of images comprising the face that corresponds to the contact.

18. The non-transitory computer readable medium of claim 17, further comprising instructions that, when executed by the at least one processor, cause the computer device to:
  detect an additional face within the image;
  identify an additional contact that corresponds to the additional face within the image; and
  identify an additional collection of images comprising the additional face that corresponds to the additional contact.

19. The non-transitory computer readable medium of claim 17, wherein the database of contacts comprises a plurality of contact images associated with at least one of a plurality of contact names.

20. The non-transitory computer readable medium of claim 19, further comprising instructions that, when executed by the at least one processor, cause the computer device to:
  determine one or more features of the face within the image; and
  compare the one or more features of the face within the image to features of images within the plurality of contact images to identify a contact image from the plurality of contact images based on related features between the image and the contact image.

* * * * *